July 13, 1948.                    G. M. RICHARD                    2,445,037
                ROTARY GRINDER WITH STATIONARY PERFORATED PLATE
                            Filed Feb. 26, 1945
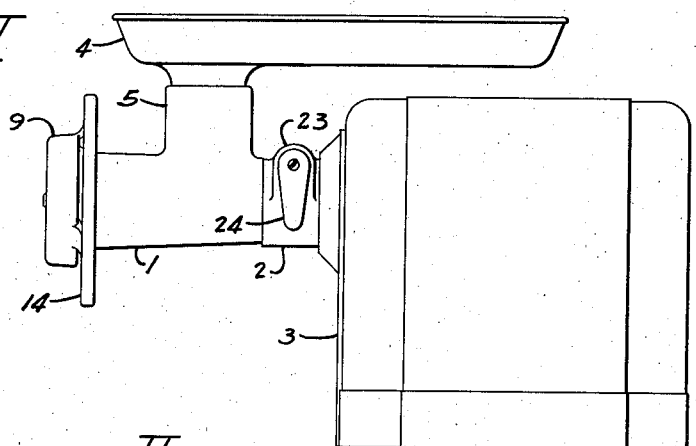
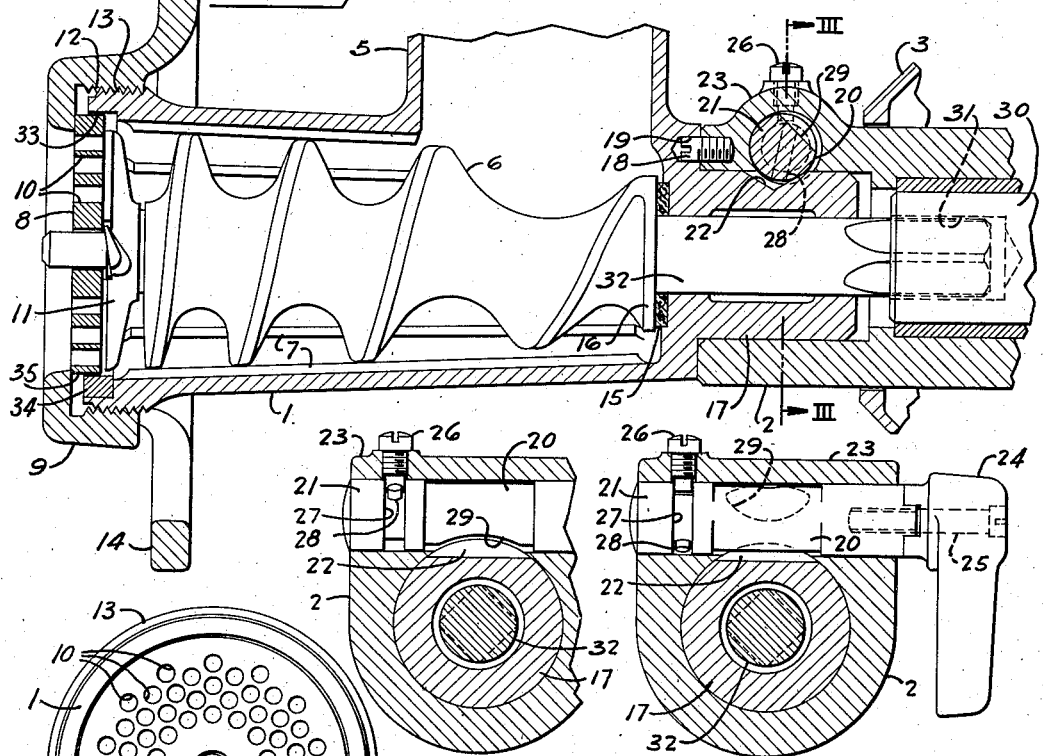
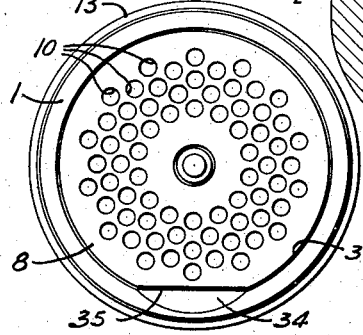
INVENTOR.
Grant M. Richard
BY
Marshall & Marshall
ATTORNEYS Patented July 13, 1948

2,445,037

UNITED STATES PATENT OFFICE 2,445,037

ROTARY GRINDER WITH STATIONARY PERFORATED PLATE

Grant M. Richard, Toledo, Ohio, assignor to Toledo Scale Company, Toledo, Ohio, a corporation of New Jersey Application February 26, 1945, Serial No. 579,728

2 Claims. (Cl. 146—182)

This invention relates to meat choppers and in particular to improvements in the means for preventing the perforated plate at the discharge end of the meat chopper from rotating with the feed screw and knife.

The commonly accepted method of retaining the perforated plate of a meat chopper is to cut a small notch in its periphery, which notch is adapted to engage a pin set in the rim of the discharge end of the chopper cylinder. This is an economical construction but suffers from several disadvantages. For economy of material the wall of a meat chopper cylinder is made quite thin and consequently there is very little space available for setting the pin into the rim of the cylinder and the pin must be of relatively small diameter. The forces generated by the revolving knife in cutting off the small nodules of meat forced into the perforations of the perforated plate are quite large, particularly if particles of bone or tough sinew are present in the meat. These forces are often large enough to shear the pin retaining the perforated plate and to cause the plate to rotate with the knife.

The object of this invention is to provide an improved method of retaining the perforated plate which affords materially greater strength without an increase in the thickness of the chopper cylinder wall or related parts.

Another object is to provide a meat chopper cylinder with a lock to prevent the rotation of the perforated plate in which the plate retaining ring contributes to the support of the chopper cylinder in resisting forces generated by the lock.

These and other objects and advantages are achieved by providing a flat on the periphery of an otherwise circular perforated plate and brazing or otherwise securing a segmentally shaped key into a recess in the periphery of the discharge end of a chopper cylinder. The plate receiving bore including the segmental key is radially within a threaded portion on which the plate retaining ring is threaded so that the retaining ring may contribute to the support of the chopper cylinder in resisting the radial forces exerted between the flat on the perforated knife and the segmental key.

This type of structure is also simple to manufacture because the perforated plate has no projections beyond its circular periphery, and the plate receiving bore in the cylinder has no inwardly directed projections (which would prevent simple boring) except the segmental key which is brazed or welded in place after the machining is completed.

To illustrate the invention a chopper incorporating it is shown in the accompanying drawings:

In the drawings:

Figure I is a side elevation of a meat chopper in which the invention may be advantageously employed.

Figure II is an enlarged vertical cross section of the chopper mechanism including a fragment of the supporting housing and drive mechanism.

Figure III is a transverse section taken along the line III—III of Figure II showing the means employed to lock the chopper cylinder in the drive housing.

Figure IV is a fragmentary section showing the locking means in unlocked position.

Figure V is an end elevation of the chopper cylinder with the perforated plate retaining ring removed.

These specific figures and the accompanying description are illustrative only and are not intended to impose limitations on the claims.

The meat chopper used to illustrate the invention comprises a chopper cylinder 1 which is mounted in a cylindrical sleeve 2 projecting from the end of a housing 3 which encloses a driving motor and a gear reduction unit. Meat to be chopped is placed in a feeding tray 4 from which it is fed downwardly into a feeding hopper 5 leading into the chopper cylinder 1. Meat that is fed through the feeding hopper 5 is engaged by a feed screw 6 which acting in cooperation with longitudinal ribs 7 cast integrally on the interior surface of the cylinder 1 feed the meat against a perforated plate 8 held at the end of the chopper cylinder 1 by a retaining ring 9. As the meat is forced against the perforated plate 8 portions of it enter perforations 10 of the plate 8 and such portions or nodules are sheared off by a knife 11 rotated by the feed screw 6.

The retaining ring 9 has internal threads 12 adapted to engage mating threads 13 cut on the outside of the chopper cylinder 1 and is further provided with a hand wheel 14 so that it may be easily tightened in place to secure adequate pressure between the perforated plate 8 and the knife 11. The pressure exerted by the perforated plate 8 is transmitted through the length of the screw 6 to a fiber washer 15 inserted between a flange 16 at the starting end of the thread of the feed screw 6 and the adjacent end of the chopper cylinder 1.

The chopper cylinder 1 is provided with a cylindrical tenon 17 extending coaxially with the feed screw 6 and adapted to enter and to be locked in the sleeve 2 of the drive housing. A stud 18 set in the front face of the sleeve 2 in position to engage a hole 19 drilled in the chopper cylinder 1 serves to pilot the chopper cylinder into correct alignment and to prevent its rotation with respect to the sleeve 2. An eccentric portion 20 of a short transverse shaft 21 is adapted by engaging the side of a shallow V-notch 22 cut transversely in the tenon 17 to lock the chopper cylinder in place. The short shaft 21 is journaled in a transverse boss 23 protruding from the otherwise cylindrical exterior of the sleeve 2. A handle 24 keyed onto the end of the shaft 21 and secured thereto by a screw 25 permits easy manipulation of the lock while a cylindrically tipped retaining screw 26 threaded through the boss 23 engages an annular groove 27 cut in the shaft 21 to prevent any axial motion of the shaft. In addition, its rotation is limited by a pin 28 set into the annular groove 27 in position to contact the tip of the retaining screw 26. The shaft 21 also has a concave transverse cut 29 to permit the chopper cylinder to be inserted or removed when the shaft 21 is turned to an unlocked position (shown in Fig. IV) as defined by engagement of the retaining screw 26 and the pin 28.

A drive shaft 30 journaled in that portion of the cylindrical sleeve 2 located within the housing 3 is provided with a square cross sectioned socket 31 adapted to receive and drive the squared end of a reduced diameter extension shaft 32 of the feed screw 6.

The discharge end of the chopper cylinder 1 has a cylindrical bore 33 adapted to receive the perforated plate 8. At one point of its periphery it is further cut away to provide space for the insertion of a segmentally shaped key 34 which is welded or otherwise secured in place. The perforated plate 8 has a portion of its otherwise circular periphery cut away to produce a flat 35 equal in extent to the length of the base of the segmentally shaped key 34. The inserted segment key 34 cooperating with the flat 35 prevents rotation of the perforated plate 8. However, in contrast to the conventional thin pin and U-shaped notch these parts are relatively heavy and are able to take the full torque which may be delivered by the driving motor.

A substantial radial force is produced on the end of the key 34 because of its wedge-like engagement with the flat 35 in resisting rotation of the perforated plate. This radial force which tends to split the cylinder 1 is resisted by the combination of the cylinder and the retaining ring 9 threaded thereon. Thus advantage is taken of the reinforcing effect of the retaining ring to secure adequate strength without increasing the amount of material used in the chopper cylinder.

In the manufacture of the chopper cylinder 1 the bore 33 is first machined as a conventional boring operation. The work or the tool is then set eccentric and the recess for the key 34 is cut. The key is then brazed or welded into place thus completing that part of the cylinder. Likewise the production of the flat 35 of the perforated plate 8 is a simple operation.

Thus the invention allows a material increase in the strength of the perforated plate retaining means without any increase in cost, material or manufacturing difficulty.

Having described the invention, I claim:

1. In a device of the class described, in combination, a chopper cylinder having a bore at its discharge end, a perforated plate adapted to be received in said bore, said perforated plate having a flat cut in its otherwise circular periphery, there being a radially extending arcuate recess cut in the wall of said bore, the radius of said recess being substantially smaller than the radius of said bore, and a segmentally shaped key secured in said recess and adapted to engage the flat on said plate.

2. A meat chopping device comprising a chopper cylinder, a feed screw in said cylinder, a knife at the end of said feed screw, a perforated plate having a flat on its periphery and being held in the discharge end of said cylinder in contact with said knife, said chopper cylinder being provided with an annular groove at its discharge end adapted to receive said perforated plate, there being a radially extending arcuate recess cut in the peripheral wall of said annular groove, the radius of said recess being substantially smaller than the radius of said groove, and a segmentally shaped key set in said recess and adapted to engage the flat on the periphery of said perforated plate to prevent rotation of said plate.

GRANT M. RICHARD.

REFERENCES CITED

The following references are of record in the file of this patent:

UNITED STATES PATENTS

| Number | Name | Date |
| --- | --- | --- |
| 296,027 | Mark | Apr. 1, 1884 |
| 352,414 | Landolt | Nov. 9, 1886 |
| 930,799 | Sander | Aug. 10, 1909 |
| 1,695,898 | Laemmel | Dec. 18, 1928 |
| 2,208,796 | Jaenichen et al. | July 23, 1940 |

FOREIGN PATENTS

| Number | Country | Date |
| --- | --- | --- |
| 552,869 | France | Jan. 31, 1923 |
| 26,384 | Great Britain | Nov. 16, 1912 |